United States Patent [19]

Rosén et al.

[11] Patent Number: 5,057,865
[45] Date of Patent: Oct. 15, 1991

[54] BURNOUT FRAME WITH UV-ABSORPTION

[75] Inventors: Lars-Åke Rosén, Sollentuna; Dan J. Lundberg, Solna, both of Sweden

[73] Assignees: Misomex Aktiebolag, Hagersten, Sweden; Misomex Aktiebolag, Hagersten, Sweden

[21] Appl. No.: 605,967

[22] Filed: Oct. 30, 1990

[30] Foreign Application Priority Data

Jan. 29, 1990 [SE] Sweden .................. 9000297

[51] Int. Cl.$^5$ .................................. G03B 27/20
[52] U.S. Cl. .................................. 355/91; 355/125
[58] Field of Search .................. 355/80, 85, 91, 94, 355/122, 125

[56] References Cited

U.S. PATENT DOCUMENTS

| | | | |
|---|---|---|---|
| 4,171,903 | 10/1979 | Robb | 355/85 X |
| 4,583,850 | 4/1986 | Thiers | 355/91 |
| 4,791,459 | 12/1988 | Hoffman | 355/91 |
| 4,835,576 | 5/1989 | Komori et al. | 355/80 X |
| 4,902,899 | 2/1990 | Lin et al. | 355/125 X |
| 4,908,658 | 3/1990 | Lundahl et al. | 355/91 X |

Primary Examiner—Richard A. Wintercorn

[57] ABSTRACT

A burnout frame for printing of a transparent original film (4) to a collecting film or printing plate (1) and a simultaneous burning out of non-image-carrying areas by means of a light of short wavelength, comprising a transparent printing glass (6,7,15), which is larger than the largest original film considered to be printed and which has a clear, central part (15) of an optical glass and of a type, which absorbs a part of the light within the ultraviolet wavelength range, particularly a bronze glass and designed to send light through the original film (4), and a diffused part (6-7) of a plastic material, located outside said part, the printing glass on its underside having one or two arrays of vacuum grooves (8, 9), designed to hold by suction an original film (4) and possibly also a masking film (5), and the glass part (15) of the printing glass being inserted into the plastic part (6-7), located on the outside, and being joined to it by means of a glue (16), which forms a light barrier between the glass part (15), and the plastic part (6-7), particularly an optical pure epoxy glue.

10 Claims, 1 Drawing Sheet

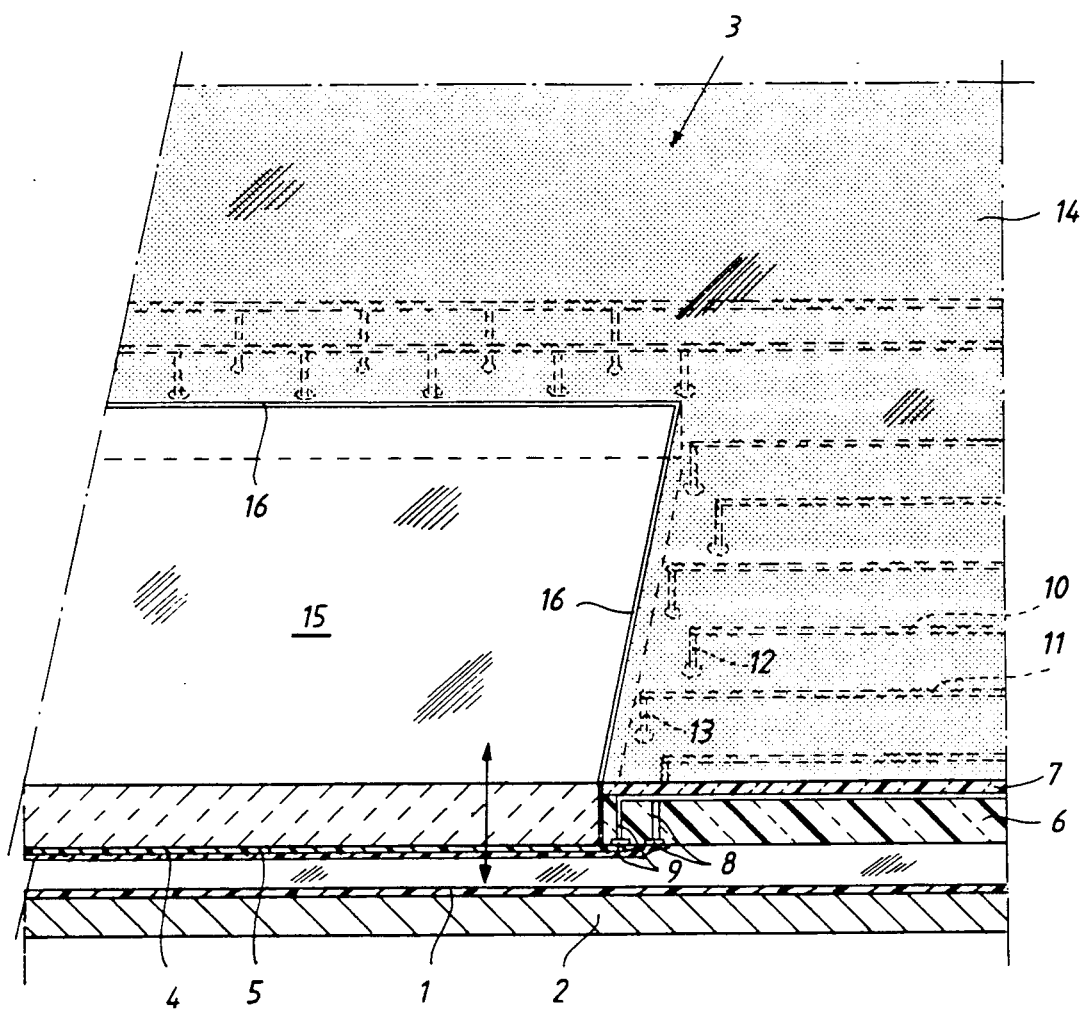

BURNOUT FRAME WITH UV-ABSORPTION

The present invention generally relates to a printing frame of the type which is used when producing films, photosensitive printing plates etc. by printing with a shortwave light, and the invention relates more particularly to such a printing frame, which is called a burnout frame and which is used to produce films and printing plates etc., particularly through a so called positive printing, i.e. such a light printing, in which the printing is done through a positive master, usually a transparent original film and down to a positive film or plate, the shortwave light causing a "burnout" of non-image-carrying areas in and often also outside the original film.

A burnout frame of this type is known through the Swedish patennt no. 8704562-1 with laid out-number 458 482. This known burnout frame has a transparent printing glass, which is larger than the largest original film considered to be printed. In order to fasten the original film by suction and possibly the masking film a few grooves are provided on the underside of the printing glass, which via ducts in the glass lead to a source of negative pressure. That part of the printing glass, which corresponds to the largest image surface on the original film is clear, whereas that part of the printing glass, which is located outside said largest image surface, has been diffused in such a way, that it allows an exposure through the printing glass to a film or a plate outside the image-surface of the original film and in some cases also through the duct-equipped, diffused part of the printing glass, without the result, that the vacuum ducts, which extend through this part of the glass, provide shadows, which form image-carrying areas in the finished film or plate. The printing glass preferably is made of a transparent plastic material, e.g. an acrylate material, e.g. Plexi.

A printing frame of this known type provides in many instances an excellent result, allowing a printing with an optimal exposure time of the image-carrying areas during a simultaneous burnout, partly of nonimage-carrying areas of the printing picture and partly also of at least some areas, located outside the image surface, through the diffused areas of the printing frame.

However, one problem with the known device is that the exposure latitude in many instances can be regarded as markedly small, i.e. that the exposure must be done with a duration and a light intensity, which only is allowed to vary within very close limits. Partly the exposure ought to be done with such an intensity and duration, that the image-carrying areas will be illuminated in the exactly right way, and partly the light intensity and the duration must be sufficient to burn out the non-image-carrying areas and at least some areas located outside the picture through the diffused areas of the printing glass and to prevent the formation of shadows from the vacuum ducts in the glass.

In some instances the suitable exposure time for the printing film or the printing plate may provide a too small amount of light to avoid the formation of shadows from the vacuum ducts in the glass; in other instances the suitable exposure time for the printing film or the printing plate maybe is so long, that a light diffusion may take place into the often demasked, diffused parts of the printing glass, also corresponding parts of the printing film or printing plate being "burned out" and rendering impossible a subsequent printing of an image within this part of the printing film or plate.

Thus, a too brief printing time results in an inferior burning out of non-image-carrying areas and a risk of a shadow formation from the vacuum ducts, and a too extended printing time results in a risk of a light diffusion into an area of the diffused part of the printing glass, which is placed outside and sometimes is demasked, and consequently a destruction of the image-receiving layer in this part of the printing film or the printing plate.

For practical reasons the printing glass in the known device comprised a plate, including two interacting plastic plates, e.g. a lower plate of an acrylic plastic, e.g. Plexiglass, and an upper plate of a polyester plastic, e.g. Makrolon, and the vacuum ducts were formed in the intermediate layer between these two plastic plates. We have found, that the light is led in such a way in the plastic layers, that it from the clear, central part often creeps into the diffused part and partly burns out the image-receiving layer in the printing film or the printing plate in such a device. Also, so called Newton-rings between the plastic layers may be formed, which injuriously influence the exposure. Also, the plastic layers are susceptible to scratches and easily become staticly charged and attract dust and other particles.

In order to solve these problems experimental work has been done to insert a glass plate into that part of the printing glass, which corresponds to the largest now used original film, i.e. the central, clear part, and to fasten by gluing this glass plate to the two plastic plates. This has solved some of the above-mentioned problems, but also with this device the drawback exists with a comparatively close exposure latitude and the risk of a diffusion of light into the plastic material in the diffused part of the printing glass and an ensuing destruction of the image-carrying layer in the printing film or the printing plate.

Experimental work has shown that the type of glue which is used to fasten the interior glass plate against the two plastic plates is crucial and may injuriously influence the result, particularly such a glue which will be discolored, e.g. be yellow slowly as is the case with some types of glue. Such a discolored glue maybe will develop such a low transparency, that image-carrying lines on the printing film or the printing plate, corresponding to these glue lines, may arise. Many types of glue also guide the light and provide a not desirable light diffusion in the duct-equipped plastic part of the printing glass. We have found that an advantageous glue is an optical pure epoxy glue, which is transparent but yet forms a type of light barrier between the glass plate and the plastic plates. The light transparency in a vertical direction is very satisfactory, despite the fact that the glue, when it dries, will be slightly pinkish.

It is desirable to be able to vary the exposure of the original film towards an under-exposure as well as an over-exposure and simultaneously increase the exposure in the diffused, exterior part of the printing glass.

In already known devices it has as a rule been necessary to use a certain overexposure of the original film in order to guarantee that no shadow formations from the vacuum ducts arise.

We have now found that a particularly satisfactory result can be obtained, if the glass plate is made of a type of glass, which absorbs a certain amount of the ultraviolet light. One example of such an efficient glass is a so called bronze glass, which is a homogenous, slightly bronze-brown-colored glass, but many other types of glasses can profitably be used. The color of the glass has no particular importance, since it is the ultraviolet radiation, which provides the burnout of the non-image-carrying areas. Since the glass absorbs a part of the UV-radiation, the exposure can be increased across all the printing glass without a risk of an overexposure of the image-carrying areas in the printing film or the printing plate, and simultaneously such a strong light radiation in the diffused areas, located outside the glass plate, is obtained, that it has been possible to eliminate the risk of a shadow-formation from the vacuum ducts completely. In this way partly an improved burnout of non-image-carrying areas in the printing film or the printing plate is attained and partly also a sharply increased exposure latitude, which makes it possible, in an advantageous way, to adjust the exposure of the original film to various requirements. For some purposes a certain underexposure perhaps is desirable, for other purposes a certain overexposure.

The UV-light-suppressing glass preferably absorbs light within the wavelength range 350-450 nm.

The accompanying drawing shows schematicly a cross-section of a printing frame according to the invention.

The printing frame shown in the drawing is designed for printing according to the so called positive method, in which light rays expose or burn out those areas, which are nonimage-carrying during the printing, from a film or a printing plate 1, which in a known way is placed on a printing table 2, and against which all the printing frame 3 with the original film 4, which is sucked into contact with the underside of the printing frame, and a possibly used masking film 5 can be lowered to a precise contact. The burned out areas of the printing plate are made non-color-carrying, when the exposed printing plate is developed.

The printing frame comprises a base plate 6, made of a transparent material, e.g. an acrylate material, e.g. Plexiglass, which suitably is of a type, which lacks UV-light-protection, and a covering plate 7, which is placed on top of this base plate 6 and is fastened to it with an intimate contact, e.g. by means of a transparent glue, a transparent double-faced adhesive tape or in another way, which does not interfere with the light transmission through the composite plate 6-7. The covering plate 7 on top of plate 6 can be made of some clear, transparent material, e.g. a polyester material, e.g. Makrolon. Base plate 6 is on its underside provided with at least two different arrays of vacuum grooves, namely an exterior groove 8 for holding by sucking an original film 4 and an interior groove 9 for holding by suction a masking film 5. The two arrays of vacuum grooves 8 and 9 are via ducts 10 and 11 connected to a source of negative pressure (not shown).

Vacuum grooves 8 for original film 4 are placed outside the limiting surface of masking film 5. For practical reasons grooves 8 and 9 are placed comparatively close to each other. Ducts 10 and 11 are suitably obtained by cutting grooves in the top face of base plate 6, which grooves are connected to vertical through holes 12 and 13, which are connected to lower placed vacuum grooves 8 and 9. The cut grooves on the top face of base plate 6 are sealed by means of covering plate 7, placed on top of plate 6. The top face of covering plate 7 is made light diffusing, e.g. dulled or obscured (blasted) on a surface 14 outside the clear glass surface above the original film. The object of the dulling of surface 14 is to provide a diffused through beam of light in order to decrease or eliminate the risk of an emergence of shadows and nonburned-out lines caused thereby on the collecting film or printing plate 1, due to refraction phenomena from vacuum grooves 8 and 9 and connection ducts 10 and 11.

As has been mentioned in connection with the discussion of the already known burnout frame, light, which is directed against the clear glass surface inside diffused surface 14, may be diffused outwards and into base plate 6 and covering plate 7 and result in a not desirable illumination and consequently a burnout of areas in printing plate 1 outside the image-carrying part of the clear glass surface. This renders a renewed printing on this second part of the printing plate impossible.

In order to eliminate this problem a square part has been cut out from composite plastic plate 6-7, and in this cut-out part a plate 15 of glass has been inserted and fastened by means of a glue line 16 on all sides. We have found that it is important that a special type of glue be used, namely a glue, which partly is transparent and does not obstruct a vertical light transmission down to the printing plate but partly nevertheless forms a light barrier in the horizontal direction along the exterior edge of glass plate 15 and consequently obstructs a diffusion of light into base plate 6 and covering plate 7. Various types of glue have been tested, not showing satisfactory results. Some types of glue lead the light out of the glass plate and into the diffusing part of the printing glass and other types of glue darken, when they dry or later on and result, when illuminated, in an non-illuminated line on all sides, which will be image-carrying on printing plate 1. However, one satisfactory glue has been found, namely an optical pure epoxy glue, which is unfadeable and which forms a type of light barrier along the edges of glass plate 15, but which still does not absorb such a large amount of light, that it forms an image-carrying line on the printing plate, and this is possible despite the fact that this glue is slightly rose-colored.

By means of the described printing frame original film 4 is exposed downwards onto the collecting film or printing plate 1, and simultaneously the non-masked parts of surface 14 of the printing glass outside glass plate 15 are illuminated. Thus, no extra illumination step is required in order to burn out those parts outside the original film, which are supposed to be non-image-carrying.

By means of the described device the flux through the printing frame can be increased, due to the fact that the risk of light rays outwards from the edges of the glass plate has been eliminated, and having this stronger flux it has also been possible to eliminate the risk of shadow-formation on printing plate 1 from vacuum ducts 10 and 11.

In many instances it is probably desirable to partly obtain a larger exposure latitude than what has been possible so far or partly increase the flux against the diffusing surface 14 without simultaneously increasing the flux through glass plate 15, and in such a case the glass plate suitably is made of a glass material, which absorbs a certain part of the ultraviolet light from the lighting of the printing machine, particularly UV-light within wavelength range 350-450 nm. We have found that a suitable glass is a homogenous bronze glass, which absorbs a certain part of the UV-light within the spectrum 350-450 nm and which has a slight auburn color with an insignificant light reduction, normally a 5-10% light reduction.

Thus, by means of a burnout frame, designed in this way, the flux against the diffused surface 14 in the printing frame can be increased without any risk of obtaining any overexposed image-carrying portions in the printing plate. It will simultaneously be possible to intentionally underexpose the printing plate without any risk of obtaining shadows from vacuum ducts 10 and 11 on printing plate 1. It is of course also possible to intentionally overexpose the printing plate, and the device consequently offers a considerably increased exposure latitude as compared to what has been possible so far. This in its turn results in a possibility to adjust the exposure to various types of printing methods and printing machines and to various desirable printing effects.

We claim:

1. A burnout frame of the type, which is used when producing collecting films, printing plates etc. by printing with a light of short wavelength, particularly through a so called positive printing, i.e. such a light printing, in which the printing is done through a positive master, usually a transparent original film (4) and down to a positive film or plate (1), the light of short wavelength providing a "burnout" of non-image-carrying areas in and often also outside the original film, the burnout frame comprising a transparent printing glass (6,7), which is larger than the largest original film considered to be printed and which has a clear, central part (15), designed to send light through the original film (4), and a diffused part (14), located outside said part, and the printing glass on its underside having one or two arrays of vacuum grooves (8,9), designed to hold by suction an original film (4) and possibly also a masking film (5), which vacuum grooves via ducts (10-13) in the diffused part (14) of the glass lead to a source of negative pressure, characterized:

in that the clear, central part of the printing glass is made of an optical glass (15), whereas the diffused part (14) can be some plastic material;

the central glass being of a type, which absorbs a part of the printing light radiation, within the ultraviolet wavelength range.

2. A burnout frame according to claim 1, characterized in that the central glass (15) and the diffused plastic part (6-7) are joined by means of a glue of a type, which forms a light barrier between the glass part (15) and the plastic part (6-7).

3. A burnout frame according to claim 1 characterized in that the glass part (15) of the printing frame is of a type, which absorbs a part of the light within the wavelength range 350-450 nm.

4. A burnout frame according to claim 1, characterized in that the glass part (15) of the printing frame is made of a homogenously colored bronze glass.

5. A burnout frame according to claim 4, characterized in that the glass part (15) is of a type, which absorbs 5-10% of the light spectrum within the visible wavelength range.

6. A burnout frame according to claim 2, characterized in that the glass part (15) and the plastic part (6-7) are joined by means of an optical, pure and fade resistant epoxy glue.

7. A burnout frame according to claim 6, characterized in that the epoxy glue in a dried condition is slightly pinkish.

8. A burnout frame according to claim 2 characterized in that the glass part (15) of the printing frame absorbs light within the wavelength range 350-450 nanometers.

9. A burnout frame according to claim 2 characterized in that the glass part (15) of the printing frame is made of a homogenously colored bronze glass.

10. A burnout frame according to claim 8 characterized in that the glass part (15) of the printing frame is made of a homogenously colored bronze glass.

* * * * *